(12) United States Patent
Sugimura

(10) Patent No.: US 9,879,867 B2
(45) Date of Patent: Jan. 30, 2018

(54) HOT WATER SUPPLY SYSTEM

(71) Applicant: Mitsubishi Electric Corporation, Tokyo (JP)

(72) Inventor: Mitsuo Sugimura, Osaka (JP)

(73) Assignee: Mitsubishi Electric Corporation, Tokyo (JP)

( * ) Notice: Subject to any disclaimer, the term of this patent is extended or adjusted under 35 U.S.C. 154(b) by 371 days.

(21) Appl. No.: 14/695,075

(22) Filed: Apr. 24, 2015

(65) Prior Publication Data

US 2016/0138811 A1    May 19, 2016

(30) Foreign Application Priority Data

Nov. 14, 2014 (JP) .................................. 2014-231416

(51) Int. Cl.
| | |
|---|---|
| *F24H 1/18* | (2006.01) |
| *F24D 3/10* | (2006.01) |
| *F24D 3/08* | (2006.01) |
| *E03B 7/04* | (2006.01) |

(52) U.S. Cl.
CPC ............... *F24D 3/10* (2013.01); *E03B 7/045* (2013.01); *F24D 3/082* (2013.01); *F24D 3/1058* (2013.01)

(58) Field of Classification Search
None
See application file for complete search history.

(56) References Cited

U.S. PATENT DOCUMENTS

| | | | | |
|---|---|---|---|---|
| 4,275,687 A | * | 6/1981 | Sasaki | F24D 17/001 122/18.2 |
| 4,296,729 A | * | 10/1981 | Cooper | F24D 17/0021 126/584 |
| 4,412,391 A | * | 11/1983 | Bolognino | D06F 58/20 122/20 B |
| 4,462,542 A | * | 7/1984 | Person | F24D 5/00 126/502 |
| 4,550,771 A | * | 11/1985 | Arbabian | F24D 11/005 126/643 |

(Continued)

FOREIGN PATENT DOCUMENTS

| | | |
|---|---|---|
| JP | S61-134538 A | 6/1986 |
| JP | 2010-117083 A | 5/2010 |

*Primary Examiner* — Thor Campbell
(74) *Attorney, Agent, or Firm* — Posz Law Group, PLC

(57) ABSTRACT

The present invention achieves energy saving and a decrease in facility cost for a hot water supply device by dividing a water receiving tank. A hot water supply system comprising: a water receiving tank receiving water supplied from a water supply source; a hot water storage tank connected to the water receiving tank via a connection pipe and storing hot water and supplying hot water to a hot water supply load; and a hot water supply device supplying the water stored in the hot water storage tank. The water receiving tank including: a temperature non-raising water receiving tank storing water supplied from the water supply source, the temperature non-raising water receiving tank, a general water supply pipe performing general water supply being connected; a temperature raising water receiving tank storing the water supplied from the water supply source and supplying the stored water to the hot water storage tank; and a preheating device preheating the water stored in the temperature raising water receiving tank.

5 Claims, 2 Drawing Sheets

(56) References Cited

U.S. PATENT DOCUMENTS

| | | | | |
|---|---|---|---|---|
| 4,699,091 A | * | 10/1987 | Waters | F24H 1/18 |
| | | | | 122/169 |
| 4,821,682 A | * | 4/1989 | Waters | F24H 1/18 |
| | | | | 122/169 |
| 4,946,558 A | * | 8/1990 | Salmon | B01D 3/00 |
| | | | | 202/167 |
| 5,245,984 A | * | 9/1993 | Longmore | F24D 17/0068 |
| | | | | 126/609 |
| 5,588,088 A | * | 12/1996 | Flaman | F24D 17/00 |
| | | | | 122/14.3 |
| 5,701,387 A | * | 12/1997 | McGugan | F24D 17/0073 |
| | | | | 122/13.3 |
| 6,564,755 B1 | * | 5/2003 | Whelan | F24D 12/02 |
| | | | | 122/20 B |
| 2009/0211567 A1 | * | 8/2009 | Thomasson | F24H 1/203 |
| | | | | 126/585 |
| 2011/0305444 A1 | * | 12/2011 | Pussell | F24D 17/0031 |
| | | | | 392/308 |

* cited by examiner

HOT WATER SUPPLY SYSTEM

TECHNICAL FIELD

The present invention relates to a hot water supply system that supplies hot water supplied from a water receiving tank.

BACKGROUND ART

As a water supply method, there are a direct coupling method in which water is directly supplied by a water main pipe, and a water receiving tank method in which water supplied by a water main pipe is received by a water receiving tank. In a case in which a building has many stories, or in which a large amount of water is used at a time, water receiving tank-type water supply is performed in which a water receiving tank is installed for supplying water. The water receiving tank-type water supply is a method in which water from a water pipe is temporarily received by a water receiving tank and water is supplied from the water receiving tank. It is possible to maintain a constant water supply pressure and a constant water supply amount even when a water pressure of a water supply pipe changes, to use a large amount of water at a time, and to further ensure water supply even at the time of water outage or disaster.

In a case in which water supplied from a water supply source is heated and supplied, a hot water supply device is used in which a hot water storage tank is connected to the water receiving tank and hot water is supplied from the hot water storage tank (for example, see Patent Literatures 1 and 2). Patent Literature 1 discloses a heat pump hot water supply device in which two hot water storage tanks connected via a pipe are provided, and a low temperature-side heat pump hot water supplier and a high temperature-side heat pump hot water supplier are respectively connected to the hot water storage tanks. Warm water heated in the low temperature-side heat pump hot water supplier is transferred from one of the hot water storage tanks to the other of the hot water storage tanks through the pipe. The warm water in the other hot water storage tank is heated by the high temperature-side heat pump hot water supplier.

Patent Literature 2 discloses a hot water supply device in which a water supply source and a cushion tank are connected to a hot water storage tank. A heat pump hot water supplier is connected to the cushion tank. A controller controls whether water from the water supply source or warm water in the cushion tank heated by the heat pump hot water supplier is supplied to the hot water storage tank based on an outside air temperature and an inflow water temperature.

CITATION LIST

Patent Literature

Patent Literature 1: Japanese Unexamined Patent Application Publication No. 61-134538 (FIG. 1)
Patent Literature 2: Japanese Unexamined Patent Application Publication No. 2010-117083 (FIG. 6)

SUMMARY OF INVENTION

Technical Problem

As described above, the hot water supply devices disclosed in Patent Literatures 1 and 2 heat water supplied from a water supply source by using a plurality of heat sources. Here, if a hot water supply system is connected to the water receiving tank and water supplied from the water receiving tank is preheated, energy saving and facility simplification can be achieved for a hot water supply system on the downstream side. However, it is considered that the capacity of a single water receiving tank needs to be set according to a plan one day use amount of water including not only hot water supply but also water supply. Therefore, it is difficult to respond to a demand for energy saving and low facility cost in a system in which water is supplied to a hot water supply device from a single water receiving tank.

The present invention has been made in order to solve the above problem, and an object thereof is to provide a hot water supply system capable of achieving energy saving and low facility cost for a hot water supply device by dividing a water receiving tank.

Solution to Problem

A hot water supply system of the present invention comprising: a water receiving tank receiving water supplied from a water supply source; a hot water storage tank connected to the water receiving tank via a connection pipe and storing hot water, and supplying hot water to a hot water supply load; and a hot water supply device supplying the water stored in the hot water storage tank, the water receiving tank including: a temperature non-raising water receiving tank storing the water supplied from the water supply source, the temperature non-raising water receiving tank being connected with a general water supply pipe performing general water supply; a temperature raising water receiving tank storing the water supplied from the water supply source and supplying the stored water to the hot water storage tank; and a preheating device preheating the water stored in the temperature raising water receiving tank.

Advantageous Effects of Invention

In accordance with the hot water supply system of the present invention, since the water receiving tank is divided into the temperature non-raising water receiving tank and the temperature raising water receiving tank, the capacity of an entire facility including the capacity of the temperature raising water receiving tank can be set. Thus, it is possible to make the temperature non-raising water receiving tank compact, and achieve low facility cost. Moreover, since the preheated water can be supplied to the hot water storage tank from the temperature raising water receiving tank, it is possible to achieve energy saving in the hot water supply device.

DESCRIPTION OF EMBODIMENTS

Embodiment 1

Figure 1:
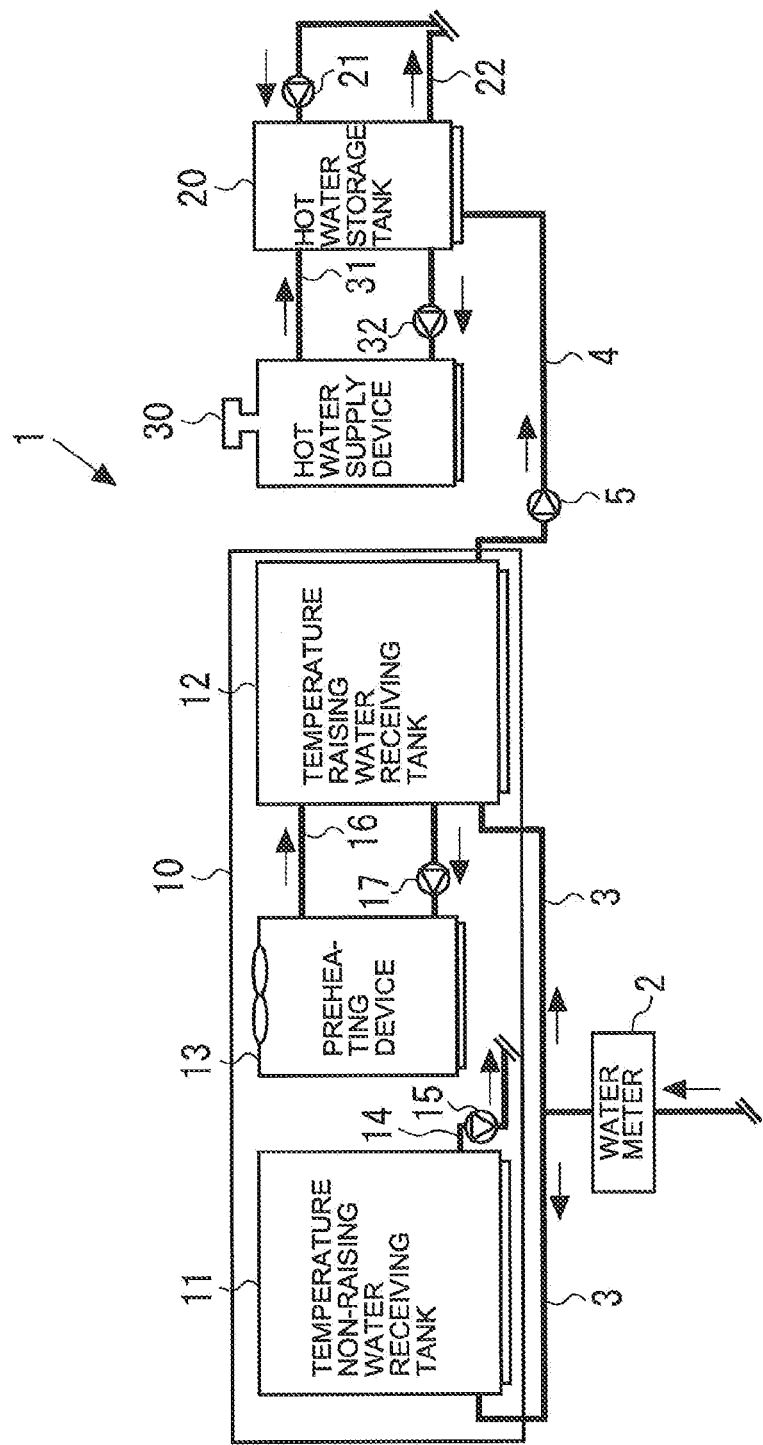
FIG. 1 is a block diagram illustrating a configuration of a hot water supply system according to an embodiment of the present invention.

An embodiment of a hot water supply system of the present invention will be described hereinafter with reference to the drawings. FIG. 1 is a block diagram illustrating a configuration of a hot water supply system according to Embodiment 1 of the present invention. In a hot water supply system 1 in FIG. 1, water supply and hot water supply are performed by using a water receiving tank method in which water supplied from a water supply source via a water meter 2 and a water supply pipe (a water main pipe) 3 is received by a water receiving tank 10. The hot water supply system 1 includes the water receiving tank 10 that receives water, a hot water storage tank 20 that stores hot water supplied from the water receiving tank 10, and a hot water supply device 30 that supplies the hot water in the hot water storage tank 20.

The water receiving tank 10 stores water poured therein from the water supply source through the water supply pipe 3, and includes a temperature non-raising water receiving tank 11, a temperature raising water receiving tank 12, and a preheating device 13. The water supply pipe 3 is connected to each of the temperature non-raising water receiving tank 11 and the temperature raising water receiving tank 12, and water is supplied thereto from the water supply source through the water supply pipe 3. The temperature non-raising water receiving tank 11 is made of a material that does not negatively affect water quality (e.g., reinforced resin, stainless steel, and steel plates), and has a structure for maintaining water tightness. A general water supply pipe 14 that performs general water supply is also connected to the temperature non-raising water receiving tank 11. The general water supply pipe 14 is provided with a water supply pump 15. When the water supply pump 15 is driven, water in the temperature non-raising water receiving tank 11 is generally supplied from the general water supply pipe 14. Note that a temperature of the water stored in the temperature non-raising water receiving tank 11 varies depending on a season, and, for example, an average temperature is 7.0 degrees C. in winter, 22.0 degrees C. in summer, and 15 degrees C. in an intermediate season.

The temperature raising water receiving tank 12 stores water preheated to a temperature higher than that of the water supplied from the water supply source. The preheating device 13 that preheats water in the temperature raising water receiving tank 12 is connected via a preheating circulation pipe 16. The temperature raising water receiving tank 12 is made of a material that does not negatively affect water quality (e.g., reinforced resin, stainless steel, and steel plates), and has a structure for maintaining water tightness. Particularly, a structure having a thermal insulation effect may be employed for the temperature raising water receiving tank 12.

For example, the preheating device 13 is composed of a heat pump-type hot water supply device. The preheating device 13 preheats the water supplied from the water supply source to, for example, 45 to 55 degrees C., and returns the preheated water to the temperature raising water receiving tank 12. Particularly, the preheating device 13 is controlled to store the preheated water in the temperature raising water receiving tank 12 by using nighttime electric power obtained in a hot water supply low-load state because of a small use amount of hot water. Although the case in which the preheating device 13 is the heat pump-type hot water supply device is described as an example, a known technique such as a boiler-type hot water supply device and a solar water heater can be applied as long as the water in the temperature raising water receiving tank 12 is preheated.

The hot water storage tank 20 is connected to the temperature raising water receiving tank 12 in the water receiving tank 10 via a connection pipe 5. The water preheated in the temperature raising water receiving tank 12 is poured into the hot water storage tank 20. A load-side circulation pipe 22 is connected to the hot water storage tank 20. Hot water stored in the hot water storage tank 20 is supplied to a hot water supply load such as a pool, a public bath, and a shower. A hot water supply circulation pipe 31 is also connected to the hot water storage tank 20, and a hot water supply circulation pump 32 is installed in the hot water supply circulation pipe 31. When the hot water supply circulation pump 32 is operated, the stored hot water is circulated between the hot water storage tank 20 and the hot water supply device 30. For example, the hot water supply device 30 is composed of a boiler-type hot water supply device. The hot water supply device 30 heats the hot water that inflows via the hot water supply circulation pump 32 to a set temperature (for example, 60 degrees C.), and returns the hot water to the hot water storage tank 20 again. Although the case in which the hot water supply device 30 is the boiler-type hot water supply device is described as an example, a known technique such as a heat pump-type hot water supply device and a solar water heater can be applied as long as the hot water in the hot water storage tank 20 is heated.

Here, the scale of the water receiving tank 10 is generally set according to a plan one day use amount of water of a facility where the hot water supply system 1 is installed. For example, when a one day use amount of water per person is Qd, and the number of personnel who use water in a building (person/day) is N, the plan one day use amount of water is N·Qd. A water receiving tank capacity V of the entire water receiving tank 10 needs to be set so as not to exceed the plan one day use amount of water N·Qd, and is calculated by using the following expression (1). Note that K is a storage coefficient in the following expression (1), and K is set to a range of 0.4 to 0.6 in a case of large-scale buildings, and 0.8 to 1.0 in a case of small-scale buildings, or hospitals and hotels.

$$V = N \cdot Qd \times K \tag{1}$$

Here, even when the water receiving tank 10 is divided into the temperature non-raising water receiving tank 11 and the temperature raising water receiving tank 12, the capacity of the temperature raising water receiving tank 12 can be added up as the capacity of the water receiving tank 10 since the temperature raising water receiving tank 12 is connected to the water supply pipe 3. Therefore, the sum of the capacity of the temperature non-raising water receiving tank 11 and the capacity of the temperature raising water receiving tank 12 is set to become the water receiving tank capacity V of the entire water receiving tank 10 in the expression (1).

At this time, the capacity of the temperature non-raising water receiving tank 11 is set by subtracting the capacity of the temperature raising water receiving tank 12 from the plan one day use amount of water, and the capacity of the temperature raising water receiving tank 12 is set based on a plan one day use amount and a planned use temperature of hot water and a set temperature of the hot water stored in the hot water storage tank 20. For example, a plan one day use amount of hot water and a planned set temperature in use (e.g., 42 degrees C.) in a hot water supply load such as a shower, a sink, and a bathtub are calculated. The planned set temperature in use (e.g., 42 degrees C.) and the set temperature in the hot water storage tank 20 (e.g., 60 degrees C.) are practically converted into an amount of hot water supplied from the hot water storage tank 20. The capacity of the temperature raising water receiving tank 12 is set based on the converted amount of hot water. On the other hand, the capacity of the temperature non-raising water receiving tank 11 is set according to a capacity obtained by subtracting the capacity of the temperature raising water receiving tank 12 from the plan one day use amount of the entire water receiving tank 10 set based on the expression (1).

When the capacity of the temperature raising water receiving tank 12 is set to, for example, 35 m$^3$ based on the plan one day use amount of hot water, and the plan one day use amount of the entire water receiving tank 10 is 45 m$^3$, the capacity of the temperature non-raising water receiving tank 11 is set to 10 m$^3$. Note that the capacity of the temperature non-raising water receiving tank 11 and the capacity of the temperature raising water receiving tank 12 differ according to a hot water supply load, an installation location, or the like.

As described above, in the hot water supply system 1 in FIG. 1, the water receiving tank 10 is divided into the temperature non-raising water receiving tank 11 and the temperature raising water receiving tank 12, and the capacity of the entire water receiving tank 10 can be set so as to satisfy the plan one day use amount of water by adding up not only the capacity of the temperature non-raising water receiving tank 11 but also the capacity of the temperature raising water receiving tank 12.

Figure 2:
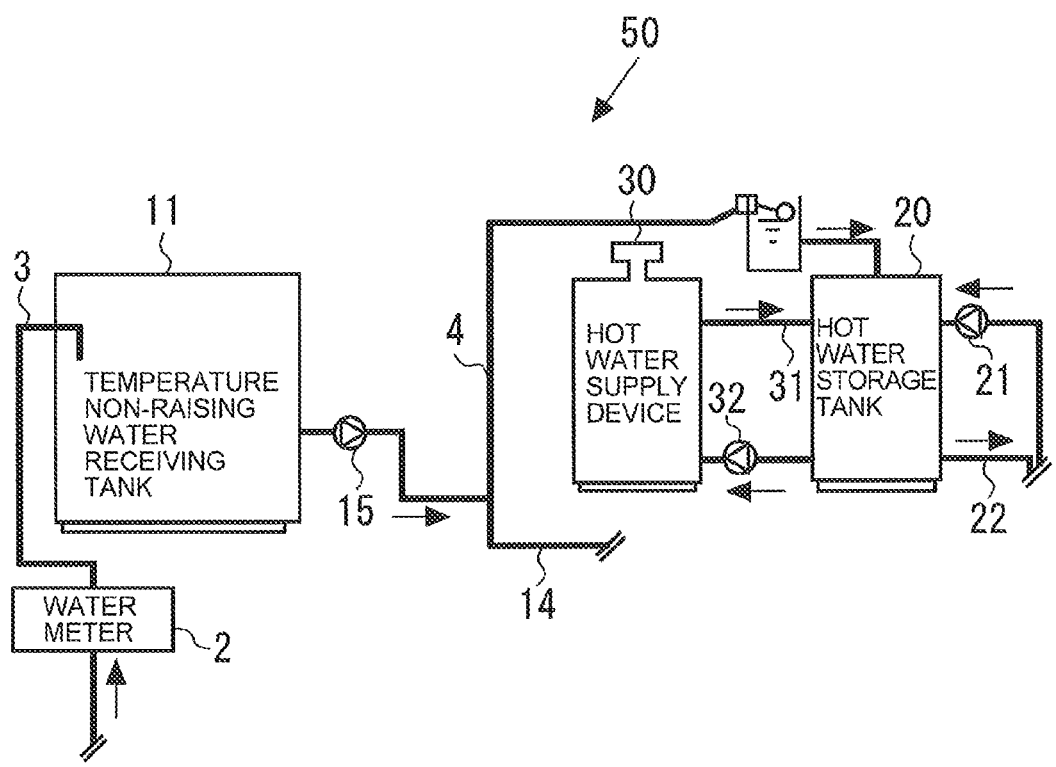
FIG. 2 is a block diagram illustrating a configuration of a conventional hot water supply system.

Here, FIG. 2 is a block diagram illustrating one example of a conventional hot water supply system. In a conventional hot water supply system 50 shown in FIG. 2, a water supply pipe 3 from a water supply source is connected only to a temperature non-raising water receiving tank 11. A pipe for hot water supply 4 and a general water supply pipe 14 branched off to be connected to the temperature non-raising water receiving tank 11. Therefore, the temperature non-raising water receiving tank 11 functions as a water receiving tank 10, and needs to be set so as to satisfy the plan one day use amount of water.

On the other hand, in the hot water supply system 1 in FIG. 1, the water supply pipe 3 branches to supply water to the temperature non-raising water receiving tank 11 and the temperature raising water receiving tank 12. Thus, both the temperature non-raising water receiving tank 11 and the temperature raising water receiving tank 12 can be considered as the water receiving tank 10. As a result, the preheated water in the water receiving tank 10 can be supplied to the hot water storage tank 20, so that energy saving and CO2 reduction can be achieved.

For example, when water having a temperature of, for example, 9.0 degrees C. is supplied from the water supply pipe 3 in winter, the water is stored in a state preheated to, for example, 45 degrees C. in the temperature raising water receiving tank 12. The water preheated to 45 degrees C. is supplied to the hot water storage tank 20, and is heated to, for example, 45 to 60 degrees C. in the hot water supply device 30. Therefore, the hot water supply device 30 only needs to raise the temperature from 45 degrees C. to 60 degrees C. as a load thereof, and it is possible to achieve energy saving and reduction of a running cost in the hot water supply device 30 as compared to a case in which the temperature is raised from 9.0 degrees C. to 60 degrees C.

Moreover, since the capacity of the temperature raising water receiving tank 12 can be also added up as the capacity of the water receiving tank 10, the capacity of the temperature non-raising water receiving tank 11 can be decreased, and cost reduction can be achieved. In other words, since the preheated water is supplied to the hot water storage tank 20 from the temperature raising water receiving tank 12, the capacity of the temperature non-raising water receiving tank 11 can be set without considering the amount of water supplied to the hot water storage tank 20. Since the capacity of the temperature non-raising water receiving tank 11 is set by subtracting the capacity of the temperature raising water receiving tank 12 from the plan one day use amount of water, the scale of the temperature non-raising water receiving tank 11 can be decreased, and the cost reduction can be achieved.

Also, when the capacity of the temperature raising water receiving tank 12 is set based on the plan one day use amount and the planned use temperature of hot water and the set temperature of the hot water stored in the hot water storage tank 20, water in an amount to be consumed in a hot water supply load in one day is already preheated in the temperature raising water receiving tank 12. It is thus possible to surely achieve the energy saving and the CO2 reduction in the hot water supply device 30.

Even when a large amount of hot water is required during a short period of time, it is also possible to exert corresponding hot water supply ability when the hot water supply device 30 is the boiler-type hot water supply device. It is further possible to suppress power consumption at the time of preheating water to a predetermined temperature when the preheating device 13 is the heat pump-type hot water supply device. Also, in a case in which the preheating device 13 preheats water by using nighttime electric power, the temperature can be raised by using inexpensive electric power. The preheated water is supplied to the hot water storage tank 20 from the temperature raising water receiving tank 12 for a hot water supply load such as a bath and a shower on the following day. In other words, in the hot water supply system 1 in FIG. 1, since the heating ability of the preheating device 13 is determined on the assumption of a hot water supply low-load state at night, it is necessary only to heat water to a predetermined temperature exclusively for the purpose of hot water storage.

Note that the embodiment of the present invention is not limited to the above configuration, and various modifications may be made, for example, as described below without departing from the scope of the invention. For example, although the case in which the single temperature non-raising water receiving tank 11 and the single temperature raising water receiving tank 12 are provided is illustrated in FIG. 1, the number of each of the temperature non-raising water receiving tanks 11 and the temperature raising water receiving tanks 12 connected to the water supply pipe 3 may be two or more.

Although the case in which the single hot water storage tank 20 is connected to the temperature raising water receiving tank is illustrated in FIG. 1, a plurality of hot water storage tanks 20 may be connected in parallel, or the hot water storage tanks 20 may be connected in series with each other. Furthermore, a water temperature at the time of preheating by the preheating device 13 may be automatically set depending on a season. For example, an average value between the temperature of the water supplied from the water supply pipe 3 and the set temperature in the hot water storage tank 20 may be set as the water temperature at the time of preheating.

REFERENCE SIGNS LIST

1, 50 hot water supply system, 2 water meter, 3 water supply pipe, 4 pipe for hot water supply, 5 connection pipe, 10 water receiving tank, 11 temperature non-raising water receiving tank, 12 temperature raising water receiving tank, 13 preheating device, 14 general water supply pipe, 15 water supply pump, 16 preheating circulation pipe, 20 hot water storage tank, 22 load-side circulation pipe, 30 hot water supply device, 31 hot water supply circulation pipe, 32 hot water supply circulation pump, V water receiving tank capacity

The invention claimed is:

1. A hot water supply system comprising:
a water receiving tank receiving water supplied from a water supply source;
a hot water storage tank connected to the water receiving tank via a connection pipe and storing hot water, and supplying hot water to a hot water supply load; and
a hot water supply device supplying the water stored in the hot water storage tank,
the water receiving tank including:
a temperature non-raising water receiving tank storing water supplied from the water supply source, the temperature non-raising water receiving tank being connected with a general water supply pipe performing general water supply;
a temperature raising water receiving tank storing the water supplied from the water supply source and supplying the stored water to the hot water storage tank; and
a preheating device preheating the water stored in the temperature raising water receiving tank, wherein:
a capacity of the temperature non-raising water receiving tank is obtained by subtracting a capacity of the temperature raising water receiving tank from a plan one day use amount of water of a facility where the hot water supply system is installed, and
the capacity of the temperature raising water receiving tank is set based on the plan one day use amount of water and a planned use temperature, and a set temperature of the hot water stored in the hot water storage tank.

2. The hot water supply system of claim 1, wherein
the hot water supply device is a boiler-type hot water supply device.

3. The hot water supply system of claim 1, wherein
the preheating device is a heat pump-type hot water supply device.

4. The hot water supply system of claim 1, wherein
the preheating device preheats the water by using nighttime electric power.

5. The hot water supply system of claim 1, wherein
a temperature of the water preheated in the preheating device is set based on a temperature of the water supplied from the water supply source and a set temperature of the hot water in the hot water storage tank.

* * * * *